Patented June 24, 1924.

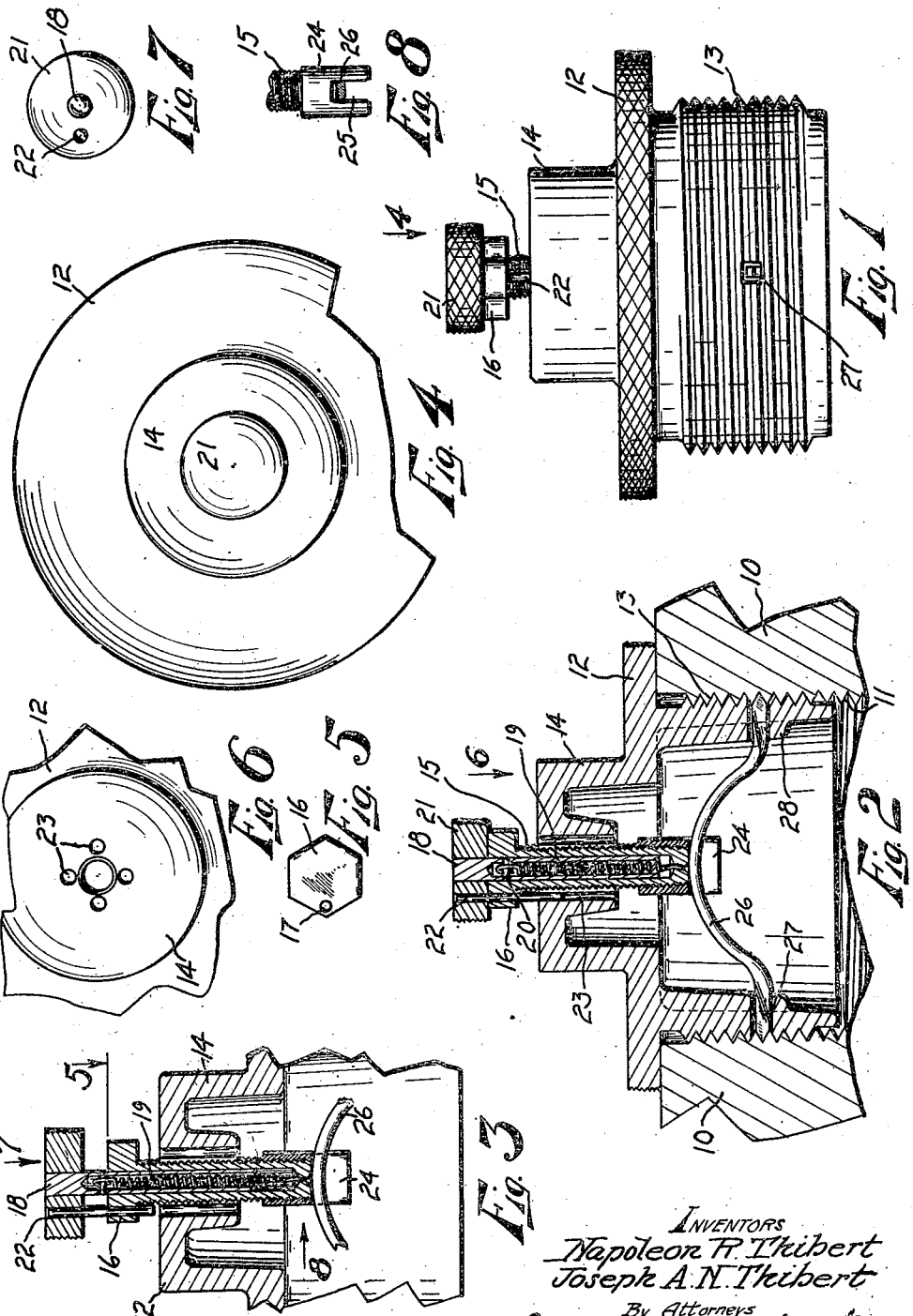

1,498,702

UNITED STATES PATENT OFFICE.

NAPOLEON R. THIBERT, OF WORCESTER, AND JOSEPH A. N. THIBERT, OF FITCHBURG, MASSACHUSETTS.

CAP FOR GREASE CUPS OR THE LIKE.

Application filed July 20, 1923. Serial No. 652,841.

*To all whom it may concern:*

Be it known that we, NAPOLEON R. THIBERT and JOSEPH A. N. THIBERT, citizens of the United States, respectively, residing at Worcester and Fitchburg, in the county of Worcester and State of Massachusetts, have invented a new and useful Cap for Grease Cups or the like, of which the following is a specification.

This invention relates to a cap or cover particularly designed for a grease cup used on railway locomotives but capable of being used in any place where the cap screws into an opening. The object of the invention is to provide simple and easily operated means by which the cap can be located in position in its opening and prevented from being dislodged by vibration. The invention also involves improvements in the features of construction and new combinations of parts as will appear for accomplishing said purpose.

Reference is to be had to the accompanying drawings, in which

Fig. 1 is a side view of an externally screw threaded cap for a grease cup constructed in accordance with this invention;

Fig. 2 is a central sectional view of the same shown in the opening of the grease cup and locked in position;

Fig. 3 is a view similar to Fig. 2 in part showing the parts of the device in unlocked condition;

Fig. 4 is a plan of the cap as shown in Fig. 1;

Fig. 5 is a plan of the head of the screw for operating the locking means;

Fig. 6 is a plan of a part of the cap with the removable base taken away;

Fig. 7 is a plan of the knurled head of the screw removed from the shank of the screw and with the pin also removed, and Fig. 8 is a side view of the collar on the bottom of the screw and connected parts.

The invention is shown as applied to a grease cup 10, such as is ordinarily used on locomotives, this cup having an internally screw threaded opening 11 through which it is filled with grease. The cap or other member 12 which is used ordinarily to close this opening is provided with an externally screw threaded part 13 adapted to screw into the opening. The exterior of the main body of the cap is usually knurled to permit screwing it up by hand and it is so shown.

The invention can be applied to any screw 13 or bolt.

This cap is provided with an extension 14 of any desired form having a central opening therethrough which is screw threaded for the reception of a hollow screw 15. This hollow screw has a head 16, shown as of hex shape for an obvious purpose, and provided with a passage 17 therethrough, the purpose of which will appear later. The bottom of the screw 15 is flat. The longitudinal passage extending nearly through this screw is occupied by a hollow pin 18 which has a coil spring 19 therein. This is shown as fixed to the pin 18 by a cross pin 20 at one end and fixed to the screw 15 at the bottom by securing its end in a small passage in the end of the screw. These two parts therefore are yieldingly connected together. On the end of the pin 18 is fixed a knurled head 21. Extending down from this knurled head is a pin 22 eccentrically located and adapted to pass down through the perforation 17 into any one of a number of perforations 23 in the extension 14. These perforations 23 are concentrically arranged around the center of this head and also the center of the screw 15.

On the bottom of the screw 15 is a collar 24 having a slot 25 in the bottom. This collar is screwed on the screw. The slot 25 is for the reception of a locking spring 26, guiding it, and preventing the collar 24 from turning with the screw. This spring is in the form of a bar extending across the inside of the hollow cap 12 and projecting outwardly, at both ends preferably, through slots 27 extending through the walls. The ends of this bar spring 26 are sharpened or formed into V-shape so that they will fit into the screw thread 11. I have shown a couple of projections 28 inside the cap 12 beyond the passages 27 to hold the bar spring in case it is drawn out and contracted. This prevents its accidental dislodgment. These projections extend only a short distance on the two sides of the end of the bar spring.

In the operation of the device the parts may be considered as in the position shown in Fig. 3. The operator pulls up on the head 21 to remove the pin 22 from the opening 23 in which it may be located but not from the opening 17. Now by turning the head 21, of course, the head 16 will be turned with it and the pin 18 as well as the screw 15 can be adjusted. This adjustment is to get the tension of the spring accurately adjusted and release the bar spring 26 from pressure so that by its natural resiliency its ends will be drawn in slightly so that the cap can be screwed in without resistance from this spring. When it is screwed in the head 21 is turned to turn the screw 15 and the parts contained in it downwardly to force down the central part of the spring 26 and force outwardly the ends thereof into the screw threads. The operator adjusts the parts until he can feel that pressure is being applied and then he turns the head 21 to such a position that the pin 22 can enter some one of the openings 23 as shown in Fig. 2. The device then is located in this position and the cap 12 cannot be dislodged by any ordinary vibration.

When it is desired to remove the cap 12 the head 21 is pulled up as shown in Fig. 3 and turned backwardly to release the pressure on the spring 26 and then the cap can be removed in the ordinary way.

This furnishes a lock which is sufficiently positive to prevent accidental displacement but is easily unlocked to enable the operators to remove the cap for filling the receptacle. It can be applied to any caps screwing into an opening in a receptacle of any kind.

Although we have illustrated and described only a single form of the invention we are aware of the fact that modifications can be made therein by any person skilled in the art without departing from the scope thereof. Therefore, we do not wish to be limited to the details herein disclosed otherwise than as set forth in the claims but what we claim is:—

1. The combination with a grease cup and a cap screwing into the top thereof, of means in the cap adapted to be projected through the wall of the cap against the threads on the cup for preventing the removal of the cap, comprising a bowed spring extending diametrically across the cap and having both ends shaped to fit in the screw threads.

2. The combination with an externally threaded member, of a locking device inside it, a screw extending through the end of said member and adjustable therein, and a collar on the screw engaging and having a slot for guiding the locking device.

3. The combination with an externally threaded hollow cap or the like, of a hollow screw threaded through the top thereof, of a hollow pin movably located in the screw, a spring in the pin connected with the pin and screw to yieldingly hold them together longitudinally and circumferentially detachable means for holding the screw and pin against turning, and means in the cap connected with, and operated by, said screw for, preventing the cap from being removed from a threaded opening.

4. The combination with an externally threaded hollow cap or the like, of a screw threaded through the top thereof, of a pin movably located in the screw, a spring connected with the pin and screw, means for holding the screw and pin against turning, means in the cap connected with, and operated by, said screw for, preventing the cap from being removed from a threaded opening, the means for preventing turning of the screw being adapted to be set in a plurality of different positions.

In testimony whereof we have hereunto affixed our signatures.

NAPOLEON R. THIBERT.
JOSEPH A. N. THIBERT.